Figure 1:
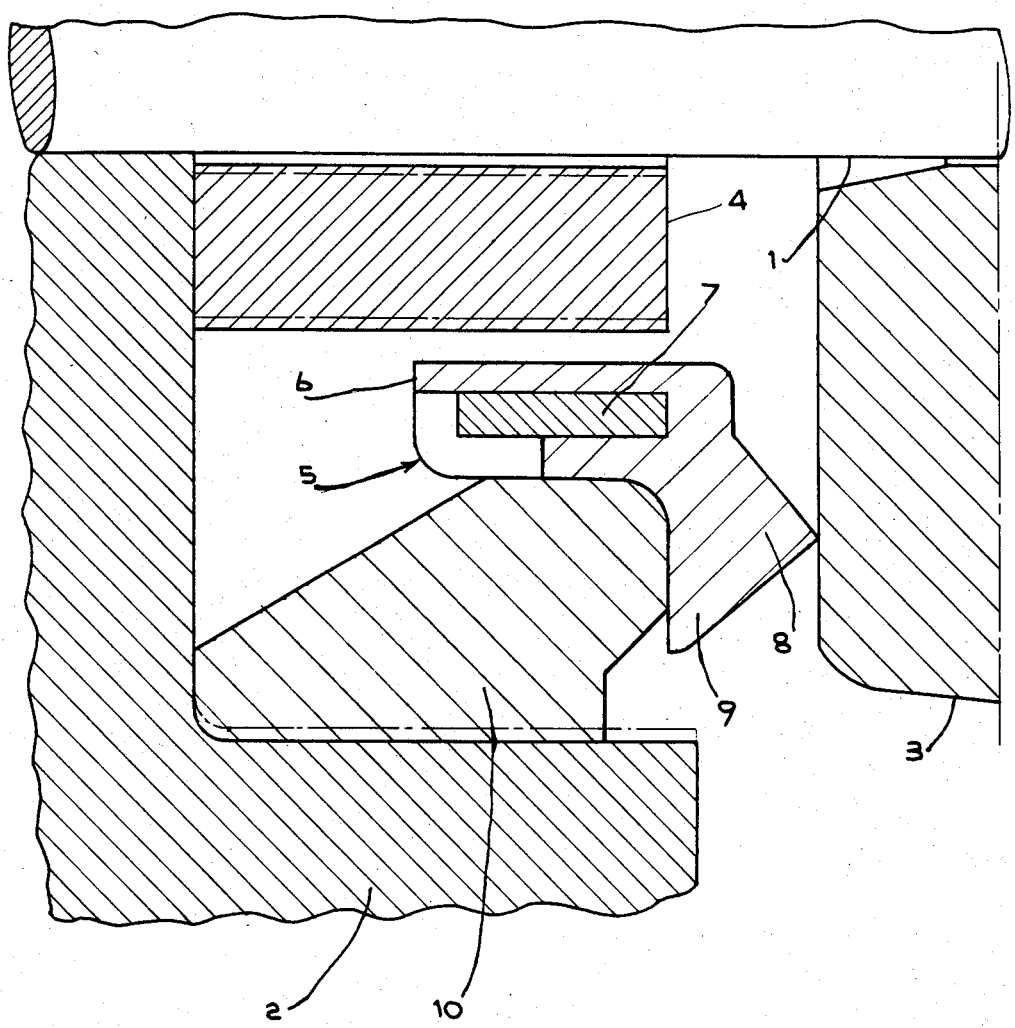

United States Patent [19]
Bissi et al.

[11] Patent Number: 4,607,854
[45] Date of Patent: Aug. 26, 1986

[54] OIL SEAL FOR LUBRICATED TRACK CHAIN JOINTS, PARTICULARLY FOR TRACK TYPE VEHICLES

[75] Inventors: Maurizio Bissi; Andrea Cocco; Guerrino Baggio, all of Castelfranco Veneto, Italy

[73] Assignee: Simmel S.p.A., Castelfranco Veneto, Italy

[21] Appl. No.: 763,304

[22] Filed: Aug. 5, 1985

Related U.S. Application Data

[63] Continuation of Ser. No. 598,887, Apr. 10, 1984, abandoned.

[30] Foreign Application Priority Data

Apr. 29, 1983 [IT] Italy ............................. 21680/83[U]

[51] Int. Cl.$^4$ .............................................. F16J 15/32
[52] U.S. Cl. ...................... 277/152; 277/92; 277/95; 277/188 A; 305/11
[58] Field of Search .................... 277/84, 92, 95, 152, 277/188 A; 305/11-15

[56] References Cited

U.S. PATENT DOCUMENTS

| | | | |
|---|---|---|---|
| 2,294,105 | 8/1942 | Wallgren | 277/84 X |
| 3,022,081 | 2/1962 | Kosatka | 277/84 X |
| 3,622,165 | 11/1971 | Hatch | 305/11 X |
| 4,089,531 | 5/1978 | Roley et al. | 277/92 |
| 4,094,516 | 6/1978 | Morley et al. | 277/92 |
| 4,132,418 | 1/1979 | Roli | 277/84 X |
| 4,240,642 | 12/1980 | Roussin | 277/84 |
| 4,262,914 | 4/1981 | Roley | 277/84 |
| 4,331,339 | 5/1982 | Reinsma | 277/84 |
| 4,396,198 | 8/1983 | Metzner et al. | 277/84 |

Primary Examiner—Robert S. Ward

[57] ABSTRACT

In an oil seal for lubricated track chain joints, particularly for track-type vehicles, of the type with a flanged primary ring of a flexible material and a secondary ring of a resilient material, the annular portion (6) of the flanged primary ring (5) carries a metal ring (7) embedded in it.

1 Claim, 2 Drawing Figures

OIL SEAL FOR LUBRICATED TRACK CHAIN JOINTS, PARTICULARLY FOR TRACK TYPE VEHICLES

This application is a continuation of application Ser. No. 598,887, filed Apr. 10, 1984, and now abandoned.

The present invention relates to oil seals for lubricated track chain joints, particularly for track vehicles. These joints comprise a pin secured to a link and a bushing and the oil seal is intended to seal between the walls of a seat provided in the link and a front wall of the bushing.

The invention relates particularly to oil seals of the above mentioned type which consist of an annular flanged element, commonly referred to as the primary ring, intended to seal, by means of a lip projecting from the flange, against the front surface of the bushing, and a resilient annular element, commonly referred to as the secondary ring, intended to maintain the lip pressed against the bushing and to secure the sealing action between the primary ring and the walls of the seal receiving seat.

In order to secure an efficient sealing action in a lubricated track chain joint, it is essential that some main conditions be maintained.

1. Continuity of the contact between the sealing lip (of the primary ring) and the front face on the bushing head.
2. Uniformity of the contact pressure along the whole perimeter of the sealing face.
3. Maintenance of the contact pressure value within exact maximum and minimum limits depending on the various constructional and operative conditions to secure the sealing capacity and the maintenance of this capacity for the expected life (in operation hours) of the joint.

In particular it is necessary to take into consideration that with the passing of the operation hours a wear occurs mainly on the front contact face of the bushing head on which a groove is scored step by step generated by the creeping of the lip. In addition, this groove is not disposed along a circumference with a strictly constant radius, but for different reasons, such as a radial play between the pin and the bushing with resultant misalignments (parallel and oblique) between the respective axes, non perfect orthogonality of the front lapped face on the bushing with respect to the axis of the joint, because of the constructional and assembly tolerances alone and thereafter also because of the step by step generated wear, and also for other reasons bound to the character of the operation (discontinuous loads, rebounds, vibrations, etc.) the actual contact of the lip with the face of the bushing shifts by a minimum radius, with a simultaneous change of the contact pressure.

Therefore, the worn area on the bushing becomes actually an annulus (variously and irregularly hollowed out) and not a mere line. This phenomenon occurs very quickly and grows step by step since the beginning of the operation of the joint.

On the basis of these considerations it is clear that it is not conceivable a seal action based on a metal (or anyway stiff) surface intended to creep on the bushing head.

In practice namely all devices based on a metal front seal, in the type of application under consideration, have proved inadequate to this purpose. This has brought to the introduction of front lip sealing devices which provide, by a suitable choice of materials of elastometric character, a substantially flexible and soft contact strip to match the degradation of the metal front surface (i.e. the bushing head) to be sealed and which parallelly has an adequate intrinsic anti-wear capacity so as to be in a position to assure the validity of the seal for the service life foreseen for the joint.

Substantially these devices can be grouped in two basic families:

A. with a substantially flexible primary ring
B. with a substantially stiff primary ring.

In the type B devices there is always a stiff element (of metal or plastic material) which supports the part intended to provide the sealing action made of an elastomer of the polyurethane type, and which is connected thereto rigidly in different ways. The stiff element is however, disposed always also behind the sealing lip, and the thrust exerted by the secondary ring (of suitable rubber) is always transmitted to the sealing lip through said stiff support and not directly. This brings again the operation conditions of these devices to the operation made of those with a metal front seal which were discussed preliminarly, in particular regarding the above mentioned basic feature (uniformity of the contact pressure distribution between the sealing lip and the front face of the bushing along the whole contact line). In fact there is no possibility to resiliently deform the primary ring which is absolutely non flexible and there remains available only the moderate resiliency of the polyurethane thickness forming the sealing ring to counterbalance the irregularities of the front face of the bushing.

It is because of this incapacity indeed of securing the uniformity of the contact pressure along the whole sealing profile, shown by the primary rings of the stiff type, that there have been developed the flexible primary ring devices. In these devices, however, a limit is imposed by the yieldingness and not sufficient stiffness of the primary ring with respect, above all, to the radial loads which are indispensable for securing the sealing action within the seat receiving the device. This yieldingness causes very strong deformation levels of the primary ring which negatively affects the correct geometry and arrangement of the sealing lip. (It should be born in mind that it is indispensable to secure under all conditions a lubrication film in the contact area between the lip and the bushing or else the lip is immediately destroyed). It has been tried to obviate this disadvantage by causing the seal to rest under deformation on an element (foreign to the sealing device) which would act as a rigid support thus limiting deformations. This element is the spacer already present in the joint with the function of axial thrust bearing as well as limiter of the axial compression which can be exerted on the sealing device. However, in different applications where the spacer does not exist or is in an unadequate form or anyway unsuitable for the purpose, these devices which require to rest on this outer element could not operate correctly or independently.

It is the object of the present invention to provide an oil seal which maintains the advantages of the two systems (stiff primary ring or flexible primary ring) and eliminates instead the disadvantages intrinsic in both types.

This is achieved by the use of a "mixed function" primary ring (half stiff for the portion experiencing radial loads, with a resultant elimination of the associated deformation, and half flexible for the portion providing the sealing action proper, i.e. the front flange with the sealing lip).

More particularly the oil seal according to the invention, of the type with a flanged primary ring of a flexible material and a secondary ring of a resilient material, is characterized in that the annular portion of the flanged primary ring carries a metal ring embedded in it.

Figure 2:
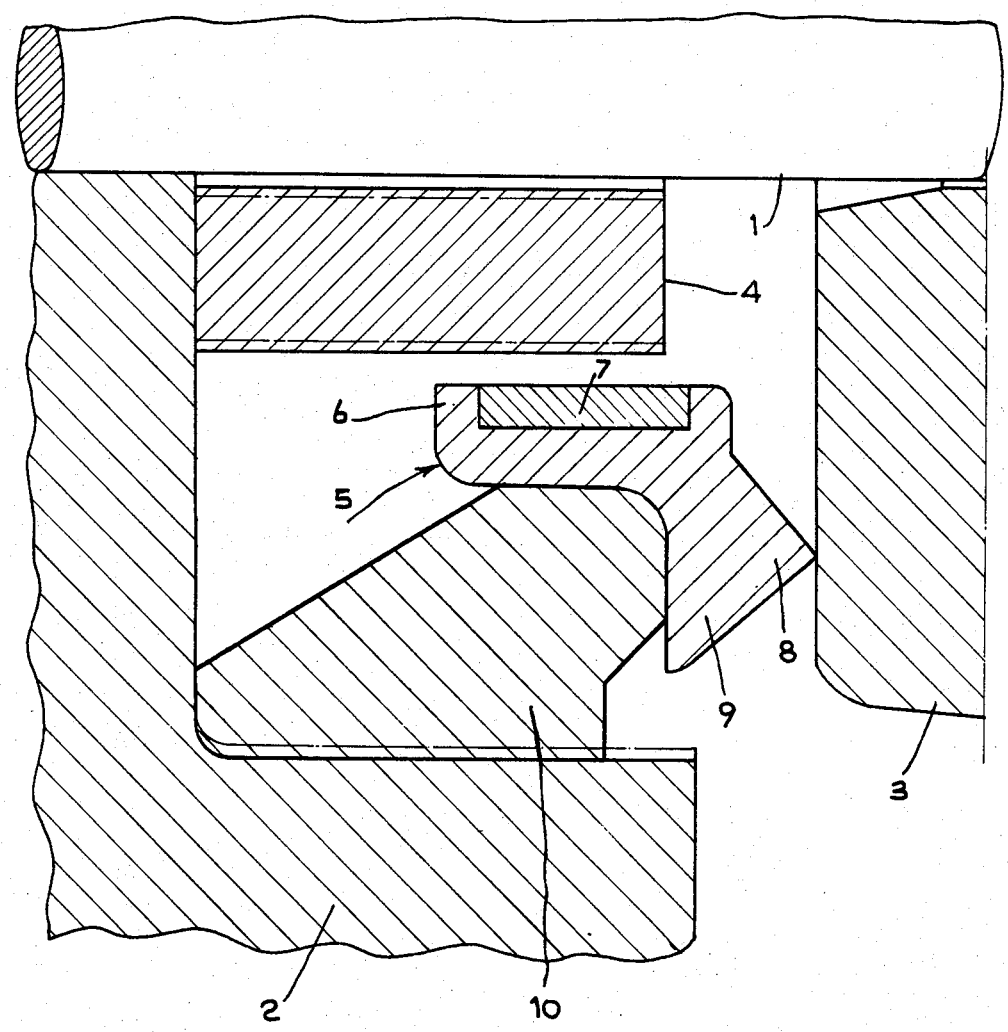

The invention will be better understood from the following description of an oil seal according to the invention, referring to the accompanying drawings in which FIGS. 1 and 2 show an axial cross-section of a seal applied to a joint of a lubricated track chain for track-type vehicles.

In these FIGS. 1 indicates the pin of the joint secured to a link 2 of the chain, whereas 3 indicates the bushing secured to another link of the chain, not shown. 4 indicates the spacer intended to limit the axial relative movements between the pin 1 and the bushing 2.

The flanged primary ring 5 carries a metal ring 7 embedded in the annular portion 6 and has a sealing lip 8 projecting from the flanged portion 9. 10 indicates the resilient secondary ring.

Because of this arrangement the axial thrust exerted by the secondary ring 10 (generally of nitrile rubber) is distributed on the rear face of the front flange 9 of the primary ring 5, which flange remains extremely flexible, directly and not through some stiff element.

In this way the true contact pressure (i.e. the axial thrust of the lip 8) is due to the local compression action, point by point, by the flexible flange 9 on the corresponding surface of the secondary rubber ring 10 and is therefore point by point present. It is not the average of the thrust exerted by the rubber ring 10 on a non deformable stiff support which must in turn distribute it on the flange of the primary ring (or which forms the rear surface thereof if incorpoarted in it). The advantage of the flexible primary ring with respect to the stiff one, is exactly that of avoiding that at localized points, becuase of the degradadation of the front surface of the bushing against which the sealing action has to be exerted, the local contact pressure may fall below the minimum indispensable required for the sealing action; this situation can viceversa easily occur with a stiff primary ring, even in the presence of high values of average axial thrust, because of the non-deformability of said ring.

Due to the presence of the metal ring 7 embedded in the annular portion 6 of the flanged primary ring 5 the device according to the invention has in addition the advantage of being self-sufficient from the standpoint of the radial loads and the absence of the attendant deformations. Theoretically the described device can be used also in applications where the other devices as such are not selfsufficient.

Even within the limits of the specific application some considerations have to be made on the importance and the influence of the working tolerances of the receiving seat and the spacer on the values of the axial thrust and radial compression the sealing devices under consideration exert.

It has been found experimentally that, for the various devices under consideration, the imposed axial deformation (spacer height) being equal, a few mm tenths difference on the seat diameter (i.e. the working tolerance of the seat) involves already appreciable changes in the value of the axial thrust exerted by the device.

Now if the effect of the tolerance on the outer diameter of the spacer (if the function of the latter is to support the primary ring of the flexible type) is added to the unavoidable component of changeability, a further reason of changeability of the axial thrust exerted is added and increases globally the difference between the maximum and the minimum value thereof.

Since the minimum thrust value must be assured for the validity of the sealing action, as a result the maximum value is increased with a resultant increase in the contact pressure. This brings to an accelerated wear of the seal both for the metal portion (bushing head) and the polyurethane lip. By considering that the working tolerance (on the outer diameter) of the spacers under consideration amounts to several mm tenths, as a result the effect of this component is not at all negligible or insignificant.

It is therefore apparent the operative advantage due to the pressure of the reinforcement 7 provided in the oil seal according to the invention which, by remaining embedded in the elastomer, is of no influence, with its tolerance, on the rest diameter of the primary ring 5. This diametercan be thus easily maintained within accurate tolerances at a very reduced cost, being merely a die dimension, thus eliminating the influence of the changeability of the spacer diameter on the axial thrust developed by the device.

It should be further considered, particularly with respect to the devices with a flexible primary ring, the aspect of the torque to be transmitted between the primary and the secondary ring. It is basic that the creeping occurs between the lip and the front surface of the bushing and that no relative rotation takes place between the primary and the secondary ring or a rotation of the whole device within the receiving seat. It is therefore indispensable that the coupling of the device with the receiving seat and the coupling between the two rings forming the device be locked sufficiently to prevent said rotations, but force instead the device as a whole to be integral with the seat and to allow just a creeping contact between the lip and the front face of the bushing. As a result, since for practical reasons it is not advisable, when the device is compressed, an interference with the diameter of the seat and it is advisable that said interference takes place only with the compression of the device until it reaches the operating diameter, radial loads of a certain consistency are required, besides for sealing purposes, also for transmitting the resisting couple. Also with regard to this aspect the devices with a fully flexible primary ring are not optimal and suffer a poor resistant capability and a great deformability.

Taking advantage of the stiffness of the axial position of the primary ring according to the invention it is possible to well support radial loads even substantial and, in addition, if necessary, to provide, in the marginal rear area of the primary ring, a set of scores which, under the action of the radial compression, the secondary rubber ring engages and thus increases the resistance of the device to torsional stress.

From the above stated it is the object of the oil seal according to the invention to meet at best the basic requirements listed above and to have in addition marked features of resistance to torsional stress and reduced global deformability and still to allow the use of polyurethane of a soft type to be chosen mainly for its anti-wear characteristics, since it has not to support radial loads due to the presence of the reinforcement and transfers the axial thrust developed by the secondary rubber ring directly to the sealing lip, point by point, without any intermediate action by stiff elements.

We claim:

1. An oil seal for a lubricated track chain joint, particularly for track-type vehicles, said joint including a bushing and a link, comprising a primary ring of a flexible elastomeric material formed with an annular portion and a flanged portion which includes an axially projecting sealing lip in contact with said bushing, a secondary ring of a resilient material adapted to be in contact with said primary ring and said link, said primary and secondary rings adapted to form a seal between said link and said bushing, and said primary ring including a cylindrically shaped metal stiffening ring embedded and located entirely within and coaxial with said annular portion such that said sealing lip and said flanged portion do not contact said metal stiffening ring, whereby said primary ring has an annular portion which is stiffened by said metal stiffening ring and a flexible flanged portion and sealing lip which are not stiffened by said metal stiffening ring.

* * * * *